United States Patent [19]

Gearhart

[11] 4,239,616
[45] Dec. 16, 1980

[54] SOLVENT DEASPHALTING

[75] Inventor: Junior A. Gearhart, Oklahoma City, Okla.

[73] Assignee: Kerr-McGee Refining Corporation, Oklahoma City, Okla.

[21] Appl. No.: 59,719

[22] Filed: Jul. 23, 1979

[51] Int. Cl.³ .............................................. C10G 21/00
[52] U.S. Cl. ..................................... 208/309; 208/45
[58] Field of Search .................................. 208/45, 309

[56] References Cited

U.S. PATENT DOCUMENTS

| | | | |
|---|---|---|---|
| 2,500,757 | 3/1950 | Kiersted | 208/309 |
| 2,527,404 | 10/1950 | De Vault | 208/309 |
| 2,729,589 | 1/1956 | Waghorne et al. | 208/309 |
| 2,783,188 | 2/1957 | Agoston | 208/309 |
| 2,940,920 | 6/1960 | Garwin | 208/45 |
| 2,980,602 | 4/1961 | Garwin | 208/45 |
| 3,003,945 | 10/1961 | Garwin | 208/45 |
| 3,003,946 | 10/1961 | Garwin | 208/45 |
| 3,003,947 | 10/1961 | Garwin | 208/45 |
| 3,005,769 | 10/1961 | Garwin | 208/45 |
| 3,053,751 | 9/1962 | Garwin | 208/45 |
| 3,364,138 | 1/1968 | Campagne et al. | 208/45 |
| 3,775,292 | 11/1973 | Watkins | 208/309 |
| 3,775,293 | 11/1973 | Watkins | 208/86 |
| 3,830,732 | 8/1974 | Gatais | 208/309 |
| 3,972,807 | 8/1976 | Uitti et al. | 208/309 |
| 4,101,415 | 7/1978 | Crowley | 208/45 |
| 4,125,459 | 11/1978 | Garwin | 208/309 |

*Primary Examiner*—Herbert Levine
*Attorney, Agent, or Firm*—William G. Addison

[57] ABSTRACT

A process for effecting a deep cut in a heavy hydrocarbon material without a decrease in the quality of the extracted oil caused by the presence of undesirable entrained resinous bodies. The heavy hydrocarbon material is admixed with a solvent and introduced into a first separation zone maintained at an elevated temperature and pressure to effect a separation of the feed into a first light phase and a first heavy phase comprising asphaltenes and some solvent. The first light phase is introduced into a second separation zone maintained at an elevated temperature and pressure to effect a separation of the first light phase into a second light phase comprising oils and solvent and a second heavy phase comprising resins and some solvent. A portion of the first heavy phase is withdrawn and introduced into an upper portion of the second separation zone to contact the second light phase after which it separates therefrom. The contacting removes at least a portion of any entrained resinous bodies from the oil contained in the second light phase.

8 Claims, 2 Drawing Figures

SOLVENT DEASPHALTING

BACKGROUND OF THE INVENTION

1. Field of the Invention

This invention relates to a process for producing at least three fractions, including a deep oil cut, from heavy hydrocarbon materials containing asphaltenes.

2. Brief Description of the Prior Art

Many methods for extracting various fractions from bituminous materials have been disclosed previously in the prior art, perhaps the most well known of these being termed "propane extraction" in which asphaltic materials are extracted or recovered from heavy hydrocarbon materials such as reduced crudes by means of a single solvent extraction step using propane as the extractant. However, it has been found that in operation, plugging of the extraction equipment frequently occurs in the section between the site of introduction of the propane and the site of introduction of the feed, thereby making continuous operation difficult.

U.S. Pat. No. 2,940,920, assigned to the same assignee as the present invention, discloses that solvents other than propane can be used to separate heavy hydrocarbon materials into at least two fractions at a greatly improved rate of separation and in a manner which eliminates certain prior art operating difficulties encountered in the use of propane type solvents ($C_2$ to $C_4$ hydrocarbon solvents). That patent discloses effecting the separation by using high temperature-pressure techniques and by using pentane as one of a group of suitable solvents. Such practice permits a deeper cut to be made in the heavy hydrocarbon material, but as a consequence, more resinous bodies are present in the resulting oil fraction, tending to decrease the quality of that oil.

U.S. Pat. No. 4,125,459, assigned to the same assignee as the present invention, discloses a process for separating a heavy hydrocarbon material into three fractions by using a combination of propane and pentane deasphalting techniques. That process includes (i) mixing the heavy hydrocarbon material with pentane at elevated temperatures and pressures to produce a light fraction containing resins and oils, (ii) mixing the light fraction with propane at high temperatures and pressures to produce a second light fraction comprising oils and a second heavy fraction comprising resins and (iii) recycling at least a portion of the resins fraction back to the pentane deasphalting process. Alternatively, that process may be carried out by subjecting the heavy hydrocarbon material first to a propane deasphalting process to prouce a heavy fraction containing asphaltenes and resins, followed by a pentane deasphalting process on the asphaltene-resin fraction previously obtained to produce a second light fraction comprising resins and a second heavy fraction comprising asphaltenes and recycling at least a portion of the resins fraction back to the propane deashalting process.

U.S. Pat. No. 3,830,732 discloses a two solvent extraction process for producing three fractions from a hydrocarbon charge stock containing asphaltenes, resins and oils. The charge stock is admixed with a first solvent in a volumetric ratio of solvent to charge stock of less than about 4:1 to form a mixture that is introduced into a first extraction zone maintained at an elevated temperature and pressure. The mixture separates within the first extraction zone to produce a first solvent-rich liquid phase containing oils which are free of asphaltenes and resins and a first solvent-lean liquid phase containing asphaltenes and resins. The solvent-lean liquid phase then is contacted with a second solvent containing at least one more carbon atom per molecule than said first solvent and introduced into a second extraction zone. The second extraction zone is maintained at a lower temperature and pressure than the first extraction zone to separate the solvent-lean liquid phase into a second solvent-rich liquid phase containing resins and a second solvent-lean liquid phase containing asphaltenes.

U.S. Pat. No. 4,101,415 discloses a single solvent extraction process for separating a heavy hydrocarbon material into three different fractions by a process employing a two stage solvent treatment wherein different solvent to feed ratios and different temperatures are used in each stage. The charge stock is admixed with the solvent in a volumetric ratio of solvent to feed in the range of 2:1 to 10:1 and introduced into a first extraction zone maintained under temperature and pressure conditions sufficient to cause the mixture to separate into a first solvent-rich fraction containing oils and a first solvent-lean fraction containing asphaltenes and resins. The solvent-lean fraction then is contacted with an additional portion of the solvent and introduced into a second extraction zone maintained at a temperature and pressure lower than in the first extraction zone to cause asphaltic solids to form. The soluble material then is separated from the asphaltic solids.

U.S. Pat. No. 3,774,292 discloses a similar process employing a two stage solvent extraction. In such patent, the solvent-rich fraction which contains resins and oils is admixed with additional solvent and introduced into a second extraction zone maintained at a temperature higher than in the first extraction zone. The solvent-rich phase is separated into a second solvent-rich phase comprising oils and a second solvent-lean fraction comprising resins.

U.S. Pat. Nos. 2,783,188; 2,980,602; 3,003,945; 3,003,946; 3,003,947; 3,005,769; 3,053,751; 3,775,293; and 3,972,807 also disclose processes for the solvent extraction of heavy hydrocarbon materials containing asphaltenes.

It would be desirable to provide a process which can provide the benefits disclosed by U.S. Pat. No. 2,940,920 while employing only a single solvent but without the reduction in product quality caused by the presence of the concurrently separated resinous bodies.

SUMMARY OF THE INVENTION

The discovery now has been made that it is possible to treat a heavy hydrocarbon material by the process hereinafter described to effect a deep cut in the heavy hyrocarbon material to produce oils which do not contain entrained resinous bodies. The process comprises contacting the heavy hydrocarbon material with a solvent in a mixing zone to provide a mixture for introduction into a first separation zone.

The first separation zone is maintained at an elevated temperature and pressure to effect a separation of the mixture into a fluid-like first light phase comprising oils, resins and solvent and a fluid-like first heavy phase comprising asphaltenes and some solvent. The first light phase is withdrawn from the first separation zone and introduced into a second separation zone.

The second separation zone is maintained at a temperature level higher than the temperature level in the first separation zone and at an elevated pressure, which can be the same pressure as that maintained in the first separation zone, to effect a separation of the first light phase into a fluid-like second light phase comprising oils and solvent which collects in an upper portion of the second separation zone and a fluid-like second heavy phase comprising resins and some solvent.

The first heavy phase is withdrawn from the first separation zone and at least a portion thereof is introduced into the upper portion of the second separation zone. The first heavy phase is introduced into the upper portion of the second separation zone to contact the second light phase and settle therethrough to remove at least a portion of any resinous bodies that may be entrained in said second light phase.

The second light phase then is withdrawn and introduced into a third separation zone maintained at an elevated temperature and pressure to effect a separation of the second light phase into a third light phase comprising solvent and a third heavy phase comprising oils. Thereafter the third heavy phase is withdrawn from the third separation zone and recovered.

In an alternate embodiment of the invention, the portion of the first heavy phase that is introducted into the upper portion of the second separation zone is heated to a temperature level sufficient to cause the formation of internal reflux within the upper portion of the second separation zone upon contact with the second light phase. The heated first heavy phase then is introduced into the upper portion of the second separation zone to contact the second light phase and remove resinous bodies that may be entrained therein by a combination of the internal reflux created therein and the countercurrent settling of the first heavy phase through said rising second light phase.

DESCRIPTION OF THE PREFERRED EMBODIMENT

Figure 1:
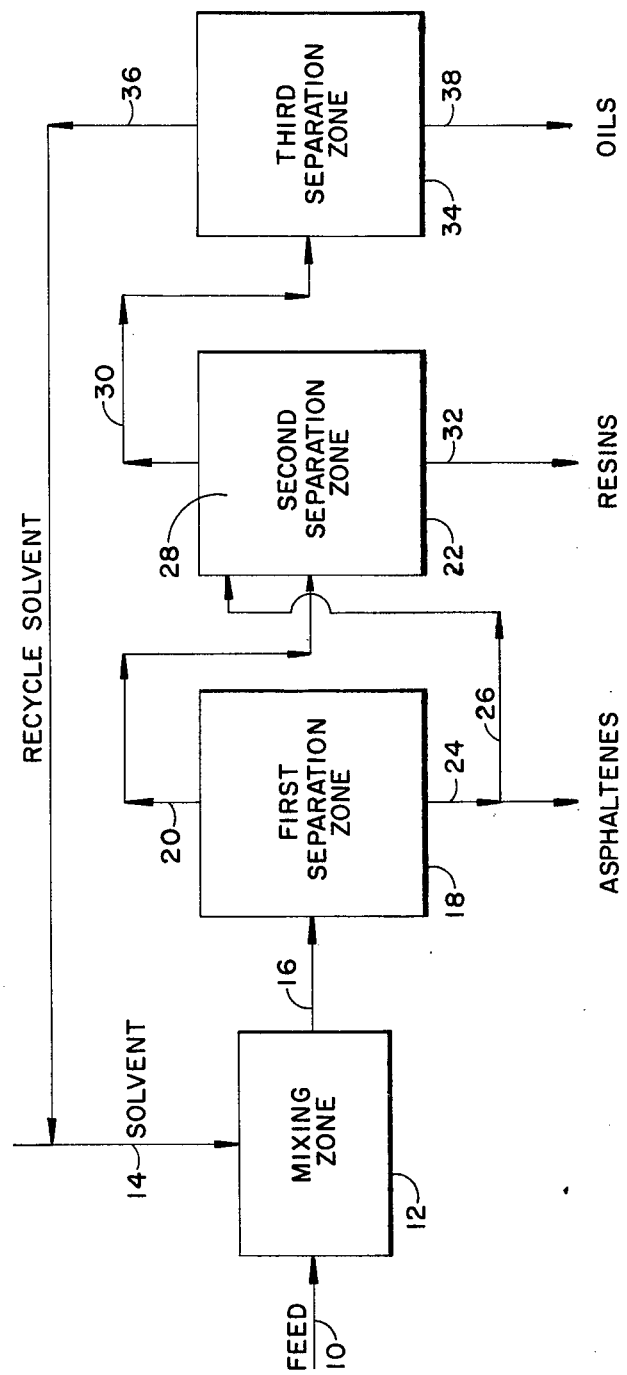
FIG. 1 is a diagrammatic illustration of the process of this invention.

Turning now to FIG. 1, the process of the present invention is illustrated. A feed stock comprising a heavy hydrocarbon material is introduced into a mixing zone 12 through a conduit 10. A solvent is introduced into mixing zone 12 through a conduit 14 to contact and admix with the feed to provide a mixture. Sufficient solvent is introduced into mixing zone 12 to provide a ratio by volume of feed to solvent in the mixture in the range of from about 1:2 to about 1:20 and preferably in the range of from about 1:8 to about 1:12. It is to be understood that larger quantities of solvent may be used, but such use is unnecessary.

The mixture is withdrawn from mixing zone 12 and introduced into a first separation zone 18 via a conduit 16. The first separation zone 18 is maintained at an elevated temperature and pressure to effect a separation of the mixture into a fluid-like first light phase comprising oils, resins and solvent and a fluid-like first heavy phase comprising asphaltenes and some solvent.

More particularly, the first separation zone 18 is maintained at a temperature level in the range of from about 200 degrees F. to about the critical temperature of the solvent and a pressure level at least equal to the actual or extrapolated vapor pressure of the solvent at its highest temperature in the first separation zone 18.

The separated first light phase is withdrawn from the first separation zone 18 through a conduit 20 and introduced into a second separation zone 22. The second separation zone 22 is maintained at a temperature level higher than the temperature level in the first separation zone 18 and at an elevated pressure to effect a separation of the first light phase into a fluid-like second light phase comprising oils and solvent and a fluid-like second heavy phase comprising resins and some solvent. The second light phase which separates within the second separation zone 22 collects in an upper portion 28 of the second separation zone 22.

The second separation zone 22 is maintained at a temperature level in the range of from about 275 degrees F. to about 200 degrees F. above the critical temperature of the solvent and a pressure level at least equal to the actual or extrapolated vapor pressure of the solvent at its highest temperature in the second separation zone 22. The pressure level in the second separation zone 22 can be substantially the same pressure level as is maintained in the first separation zone 18.

The deep oils cut separated by the above process from the feed of heavy hydrocarbon material normally contains some entrained resinous bodies. The inventor has discovered that the treatment hereafter described provides an effective and economical removal of the entrained resinous bodies from the oils.

The first heavy phase is withdrawn from the first separation zone 18 through a conduit 24 for recovery. At least a portion of the first heavy phase is withdrawn from conduit 24 through a conduit 26 and is introduced into the second separation zone 22. The first heavy phase portion is introduced into the upper portion 28 of the second separation zone 22 via conduit 26. The first heavy phase contacts and admixes with the second light phase and thereafter settles therethrough to remove at least a portion of any resinous bodies which may have been entrained within the second light phase.

Preferably, the first heavy phase is introduced in an amount sufficient to provide a ratio by volume of first heavy phase to resins contained in the first light phase in the range of from about 1:20 to about 1:10. If lesser quantities of the first heavy phase are employed, lessor quantities of the resinous bodies present in the second light phase will be removed from said second light phase. Larger quantities of the first heavy phase also can be used, but such use unnecessarily contaminates the second heavy phase product. In the event larger quantities of first heavy phase are used, it may be necessary to introduce the second heavy phase into an additional separation zone, with or without additional solvent, to effect a reseparation of the asphaltenes and resins as was originally effected in the first separation zone 18.

While the mechanism is not understood, it is believed that the introduction of the first light phase into the upper portion 28 of the second separation zone 22 to contact the second light phase effects the removal of the resinous bodies contained therein by liquid-liquid adsorption since no solids are believed to exist within the feed mixture or within the first separation zone 18, second separation zone 22 or the products withdrawn therefrom at the operating conditions of the present invention.

The second heavy phase, including the advanced portion of the first heavy phase, is withdrawn from the second separation zone 22 through a conduit 32 for recovery.

The second light phase is withdrawn from the second separation zone 22 through a conduit 30 and introduced into a third separation zone 34. The third separation zone 34 is maintained at an elevated temperature and pressure to effect a separation of the second light phase into a third light phase comprising solvent and a third heavy phase comprising oils. The temperature level in the third separation zone 34 is maintained at a level higher than the temperature level within the second separation zone 22 and the pressure level is maintained at least equal to the actual or extrapolated vapor pressure of the solvent at its highest temperature in the third separation zone 34. More particularly, the temperature level in the third separation zone 34 is maintained higher than about 400 degrees F.

The separated third light phase is withdrawn from the third separation zone 34 through a conduit 36 for recycle to mixing zone 12 to aid in the preparation of the mixture produced therein.

The third heavy phase is withdrawn from the third separation zone 34 through a conduit 38 and recovered.

The first, second and third heavy phases withdrawn through conduits 24, 32 and 38 respectively may be introduced into individual stripping sections (not shown) to strip any solvent that may be contained in said phases. Preferably the stripping sections would comprise steam strippers. The recovered solvent then can be recycled to the mixing zone 12.

Figure 2:
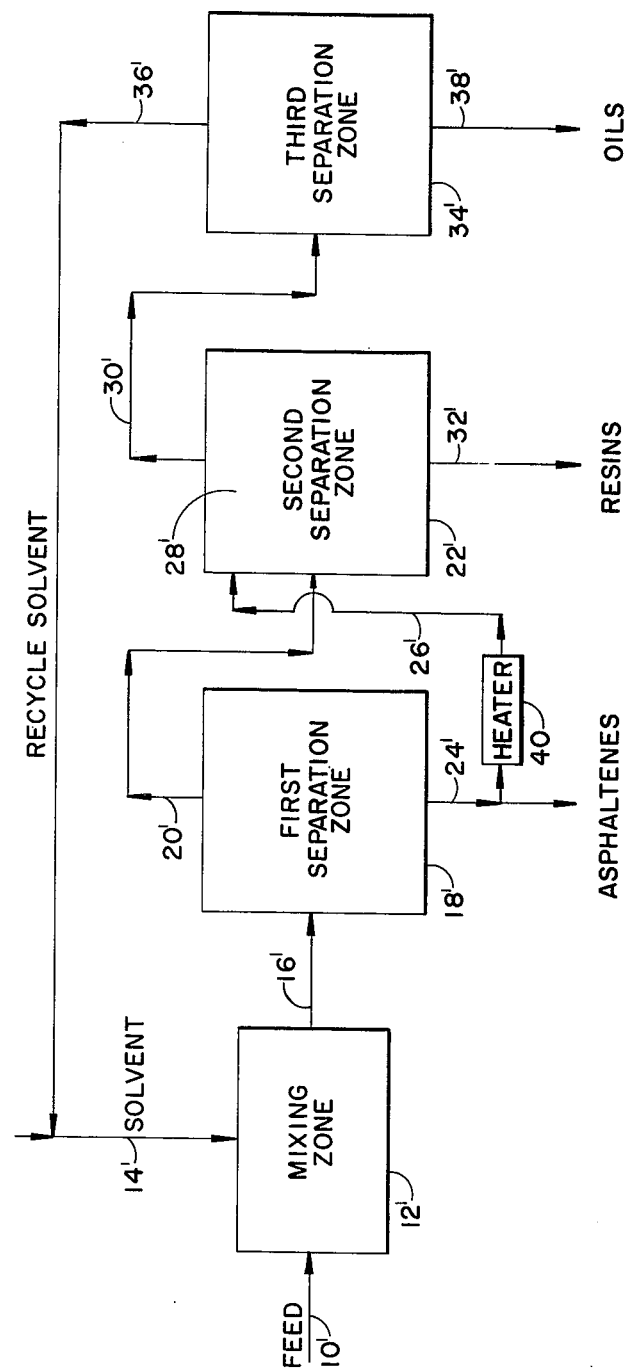
FIG. 2 is a diagrammatic illustration of the process of this invention depicting heating of the advanced first heavy phase prior to introduction into the second separation zone.

Turning now to FIG. 2 an alternate embodiment of the present invention is illustrated. In this embodiment, the feed stock is introduced into mixing zone 12' through a conduit 10'. Solvent is introduced into the mixing zone 12' through a conduit 14' to contact and admix with the feed to provide a mixture. The mixture is withdrawn from the mixing zone 12' through a conduit 16' and introduced into a first separation zone 18'. The first separation zone 18' is maintained at an elevated temperature and pressure as previously described hereinabove to effect a separation of the mixture into a first light phase and a first heavy phase.

The first light phase is withdrawn from the first separation zone 18' through a conduit 20' and introduced into a second separation zone 22'. The second separation zone 22' is maintained at an elevated temperature and pressure as hereinbefore described to effect a separation of the first light phase into a second light phase which collects in an upper portion 28' of the second separation zone 22' and a second heavy phase.

The first heavy phase is withdrawnn from the first separation zone through a conduit 24' and at least a portion thereof, as previously described, is withdrawn from conduit 24' through a conduit 26' for introduction into the upper portion 28' of the second separation zone 22'. The portion of first heavy phase is heated to a temperature level higher than the temperature level within the second separation zone 22' prior to introduction thereinto by passage through a heater 40 interposed in conduit 26'. When the heated first heavy phase contacts the second light phase within the upper portion 28' of the second separation zone 22' an internal reflux zone is formed as a result of the temperature difference between the fluids. The second light phase contained within the upper portion 28' of the second separation zone 22' is scrubbed of at least a portion of any resinous bodies that may be contained therein by the combination of the reflux action and the subsequent countercurrent settling of the first heavy phase in relation to the rising second light phase within the second separation zone 22'.

The second heavy phase, including the advanced portion of the first heavy phase, is withdrawn from the second separation zone 22' through a conduit 32' and recovered.

The second light phase is withdrawn from the second separation zone 22' through a conduit 30' and introduced into a third separation zone 34'. The third separation zone 34' is maintained at an elevated temperature and pressure as hereinbefore described to effect a separation of the second light phase into a third light phase comprising solvent and a third heavy phase comprising oils.

The third light phase is withdrawn from the third separation zone 34' through a conduit 36' for recycle to the mixing zone 12' to aid in forming the mixture produced therein.

The third heavy phase is withdrawn from the third separation zone 34' through a conduit 38' for recovery.

To further illustrate the process of this invention and not by way of limitation the following examples are provided.

EXAMPLE I

A reduced crude comprising 18 percent asphaltenes, 30 percent resins and 52 percent oils, by weight, having a softening point of about 110 degrees F. is admixed with benzene in a volume ratio of feed to solvent of 1:10 and introduced into a first separation zone. The first separation zone is maintained at a temperature of 550 degrees F. and a pressure of 900 psig. The feed mixture separates into a first light and a first heavy phase. The first light phase is withdrawn and introduced into a second separation zone maintained at a temperature of 600 degrees F. and a pressure of 900 psig. The first light phase separates into a second light phase and a second heavy phase. A portion of the second light phase is withdrawn from the second separation zone and is found to contain entrained resinous bodies that were not separated as the second heavy phase. A portion of the first heavy phase comprising a volume of about 5 percent of the volume of the resins present in the feed is withdrawn from the first separation zone and introduced into contact with the second light phase in the second separation zone and permitted to settle therethrough. A second portion of the second light phase is withdrawn from the second separation zone and is found to contain less entrained resinous bodies than the first portion.

EXAMPLE II

The reduced crude of Example I is admixed with n-pentane in a volume ratio of feed to solvent of 1:10 and introduced into a first separation zone maintained at a temperature of 250 degrees F. and a pressure of 125 psig. The feed mixture separates into a first light phase and a first heavy phase. The first light phase is withdrawn and introduced into a second separation zone maintained at a temperature of 310 degrees F. and a pressure of 240 psig. The first light phase separates into a second light phase and a second heavy phase. A portion of the second light phase is withdrawn from the second separation zone and is found to contain entrained resinous bodies that were not separated as the second heavy phase. A portion of the first heavy phase comprising a volume of about 5 percent of the volume of the resins present in the feed is withdrawn from the first separation zone and introduced into contact with the second light phase in the second separation zone and permitted to settle therefrom. A second portion of the second light phase is withdrawn from the second separation zone and is found to contain less entrained resinous bodies than the first portion.

EXAMPLE III

A steep roofing blown asphalt having a softening point of 195 degrees F. is admixed with isobutylene in a volume ratio of feed to solvent of 1:10 and introduced into a first separation zone maintained at a temperature of 240 degrees F. and a pressure of 300 psig. The feed mixture separates into a first light phase and a first heavy phase. The first light phase is withdrawn and introduced into a second separation zone maintained at 291 degrees F. and 600 psig. The first light phase separates into a second light phase and a second heavy phase. A portion of the second light phase is withdrawn from the second separation zone and is found to contain entrained resinous bodies that were not separated as the second heavy phase. A portion of the first heavy phase comprising a volume of about 5 percent of the volume of the resins present in the feed is withdrawn from the first separation zone and introduced into contact with the second light phase in the second separation zone and permitted to settle therefrom. A second portion of the second light phase is withdrawn from the second separation zone and is found to contain less entrained resinous bodies than the first portion.

The foregoing examples illustrate the effectiveness of the present invention in reducing the quantity of entrained resinous bodies contained in oils separated from heavy hydrocarbon materials.

The term "heavy hydrocarbon material" means pyrogenous bitumens and native bitumens, one or more fractions or components thereof, products obtained by treating these materials or one or more of their components or fractions with air or another oxygen containing gas in the presence or absence of catalysts and products obtained by otherwise treating these materials. The pyrogenous bitumens include heavy or very low API gravity petroleum crudes, reduced crudes, either steam or vacuum refined, hard and soft wood pitches, coal tar residues, cracked tars, tail oil and the like. The native bitumens include gilsonite, wurtzilite, albertite and native asphalt, for instance, Trinidad asphalt and the like. Suitable catalysts include, for example, phosphorus pentoxide, ferric chloride, cobaltic salts and the like. The term "otherwise treating" includes, for example, condensation of asphalt-type material in the presence of a suitable agent to produce heavier or more complex materials. Examples of a suitable treating agent are catalysts of the Friedel-Craft type.

The term "solvent" means a fluid comprising at least one member selected from the group consisting of: aromatic hydrocarbons having normal boiling points below 310 degrees F., such as benzene, toluene, o-, m- and p-xylene and isopropyl benzene; paraffin hydrocarbons containing from 3 through 9 carbon atoms, such as propane, butane, pentane, hexane, heptane, octane and nonane; and mono-olefin hydrocarbons containing from 4 to 8 carbon atoms, such as butene, pentene, hexene, heptene and octene.

While the invention has been described with respect to what at present are preferred embodiments thereof, it will be understood, of course, that certain changes, substitutions, modifications and the like may be made therein without departing from its true scope as defined in the appended claims.

What is claimed is:

1. A deasphalting process comprising:
    providing a heavy hydrocarbon material;
    providing a solvent;
    admixing said heavy hydrocarbon material with said solvent in a mixing zone to form a mixture;
    introducing said mixture into a first separation zone maintained at an elevated temperature and pressure to effect a separation of said mixture into a first light phase comprising oils, resins and solvent and a first heavy phase comprising asphaltenes and some solvent;
    introducing said first light phase into a second separation zone maintained at a temperature level higher than the temperature in the first separation zone and at an elevated pressure to effect a separation of said first light phase into a second light phase comprising oils, entrained resins and solvent which collects in an upper portion of said second separation zone and a second heavy phase comprising resins and some solvent;
    withdrawing said first heavy phase from said first separation zone;
    introducing at least a portion of said first heavy phase into said upper portion of said second separation zone to contact said second light phase and settle therethrough to remove at least a portion of the entrained resins;
    introducing said second light phase after contact with said first heavy phase into a third separation zone maintained at an elevated temperature and pressure to effect a separation of said second light phase into a third light phase comprising solvent and a third heavy phase comprising oils; and
    recovering the third heavy phase as a product.

2. The process of claim 1 defined further to include the step of:
    heating said portion of said first heavy phase to a temperature level higher than the temperature level within the second separation zone prior to introducing said portion into said upper portion of said second separation zone.

3. The process of claim 1 defined further to include the step of:
    heating said portion of said first heavy phase prior to introducing said portion into said upper portion of said second separation zone to a temperature level sufficient to cause the formation of an internal reflux zone within said upper portion of said second separation zone upon introduction therein to scrub at least a portion of the entrained resins from said second light phase.

4. The process of claim 1 wherein providing said solvent is defined as:
    providing a solvent comprising at least one member selected from the group consisting of aromatic hydrocarbons having normal boiling points below 310 degrees F., paraffin hydrocarbons containing from 3 through 9 carbon atoms and mono-olefin hydrocarbons containing from 4 through 8 carbon atoms.

5. The process of claim 1 wherein said introduction of said first heavy phase into said upper portion of said second separation zone is defined further as:

introduction said first heavy phase in an amount sufficient to provide a ratio by volume of first heavy phase to resins contained in said first light phase in the range of from about 1:20 to about 1:10.

6. The process of claim 1 wherein the first separation zone is maintained at an elevated temperature and pressure defined further as:

maintaining said first separation zone at a temperature level in the range of from about 200 degrees F. to about the critical temperature of the solvent and a pressure level at least equal to the actual or extrapolated vapor pressure of the solvent at its highest temperature in said first separation zone.

7. The process of claim 1 wherein the second separation zone is maintained at a temperature level above the first temperature level and at an elevated pressure defined further as:

maintaining said second separation zone at a temperature level higher than the temperature level in the first separation zone and in the range of from about 275 degrees F. to about 200 degrees F. above the critical temperature of the solvent and a pressure level at least equal to the actual or extrapolated vapor pressure of the solvent at its highest temperature in said second separation zone.

8. The process of claim 1 wherein the third separation zone is maintained at an elevated temperature and pressure defined further as:

maintaining said third separation zone at a temperature level higher than the temperature level in the second separation zone and at a pressure level at least about equal to the actual or extrapolated vapor pressure of the solvent at its highest temperature in said third separation zone.

* * * * *